(12) United States Patent
Song et al.

(10) Patent No.: US 8,678,636 B2
(45) Date of Patent: Mar. 25, 2014

(54) LIGHT GUIDE PLATE FOR BACKLIGHT AND MANUFACTURING METHOD THEREFOR

(75) Inventors: Min-Young Song, Asan-si (KR); Seong-Yong Hwang, Asan-si (KR); Joong-Hyun Kim, Asan-si (KR); Sang-Won Lee, Incheon (KR); Jin-Sung Choi, Cheonan-si (KR); Ju-Hwa Ha, Asan-si (KR); Jin Seo, Osan-si (KR); Yong-Kyu Kang, Yongin-si (KR)

(73) Assignee: Samsung Display Co., Ltd. (KR)

( * ) Notice: Subject to any disclaimer, the term of this patent is extended or adjusted under 35 U.S.C. 154(b) by 206 days.

(21) Appl. No.: 13/286,584

(22) Filed: Nov. 1, 2011

(65) Prior Publication Data

US 2012/0327685 A1   Dec. 27, 2012

(30) Foreign Application Priority Data

Jun. 22, 2011   (KR) ........................ 10-2011-0060841

(51) Int. Cl.
*F21V 7/04* (2006.01)

(52) U.S. Cl.
USPC ............ 362/615; 362/620; 362/626; 362/617

(58) Field of Classification Search
USPC .................. 362/615, 620, 626, 617, 618, 627
See application file for complete search history.

(56) References Cited

U.S. PATENT DOCUMENTS

| | | | |
|---|---|---|---|
| 7,883,254 B2 * | 2/2011 | Kinoshita et al. | 362/615 |
| 8,147,111 B2 * | 4/2012 | Wang et al. | 362/615 |
| 2007/0189040 A1 * | 8/2007 | Chi et al. | 362/620 |
| 2010/0033989 A1 | 2/2010 | Teng et al. | |

FOREIGN PATENT DOCUMENTS

| | | |
|---|---|---|
| JP | 2006-040710 A | 2/2006 |
| JP | 2007-011174 A | 1/2007 |
| JP | 4225291 B | 12/2008 |
| KR | 10-0736075 B | 6/2007 |
| KR | 10-0826946 B | 4/2008 |
| KR | 1020090025108 A | 3/2009 |
| KR | 1020090065834 A | 6/2009 |
| KR | 1020100009827 A | 1/2010 |
| KR | 1020100032988 A | 3/2010 |
| KR | 1020100078298 A | 7/2010 |

\* cited by examiner

*Primary Examiner* — Evan Dzierzynski
(74) *Attorney, Agent, or Firm* — Innovation Counsel LLP

(57) ABSTRACT

A light guide plate for a backlight. The light guide plate includes: a light source unit for generating light; a light guide plate proximate to the light source unit and including an upper surface and a lower surface; and a light emission pattern configured to diffuse a portion of the light directed toward an image display panel, and a first straight pattern configured to channel the light along a direction substantially parallel to a direction of propagation of the light generated by the light source unit, both the light emission pattern and the first straight pattern being disposed on one of the upper surface and the lower surface of the light guide plate, in which the first straight pattern has peaks and valleys formed in alternating and repeating manner in a direction substantially perpendicular to a direction of propagation of the light generated by the light source unit.

10 Claims, 14 Drawing Sheets

LIGHT GUIDE PLATE FOR BACKLIGHT AND MANUFACTURING METHOD THEREFOR

CROSS-REFERENCE TO RELATED APPLICATION

This application claims priority to, and the benefit of, Korean Patent Application No. 10-2011-0060841 filed in the Korean Intellectual Property Office on Jun. 22, 2011, the entire contents of which are incorporated herein by reference.

BACKGROUND OF THE INVENTION (a) Field of the Invention

Embodiments of the present invention relate generally to flat panel displays. More specifically, embodiments of the present invention relate to a light guide plate for a backlight, and a manufacturing method therefor.

(b) Description of the Related Art

Much recent effort has focused on the development of various flat panel type display devices such as liquid crystal displays (LCDs), plasma display panel (PDPs), organic light emitting diode (OLED) displays, and the like.

The LCD has found widespread acceptance as a mobile flat panel display due to merits such as its excellent image quality, lightness, flatness, and low power consumption. As such, it has found uses in laptop computers, computer monitors, television displays, and the like. However, since the LCD panel itself does not emit light, a separate external light source is required in order to implement high-quality images. Accordingly, LCDs typically include a backlight unit that functions as a light source, supplying light to the liquid crystal panel, thereby projecting images.

The backlight unit typically includes a light source unit, a light guide plate, a reflector, and the like. The light generated from the light source unit is inputted to the light guide plate and the light is internally reflected, diffused, and refracted, and ultimately output to the liquid crystal panel.

The light guide plate is generally manufactured via an injection molding method. In the injection molding method, the entire light guide plate is injection-molded once so as to form fine optical patterns on the lower surface, or both upper and lower surfaces of the light guide plate. Additionally, light provided from the side is reflected or refracted by a shape of the optical pattern, and progresses toward the upper surface.

To improve the distribution and luminance of light, the light guide plate can be molded to include a pattern such as a lenticular shape. However, this increases the cost of the light guide plate.

The above information disclosed in this Background section is only for enhancement of understanding of the background of the invention, and therefore it may contain information that is not in the prior art.

SUMMARY OF THE INVENTION

The present invention has been made in an effort to provide a light guide plate for a backlight having an advantage of improving straightness (or the direction and distribution) of light, and a manufacturing method therefor.

An exemplary embodiment of the present invention provides a light guide plate for a backlight, including: a light source unit configured to generate light; a light guide plate positioned proximate to the light source unit and including an upper surface and a lower surface; and a light emission pattern configured to diffuse a portion of the light directed toward an image display panel, and a first straight pattern configured to channel the light along a direction substantially parallel to a direction of propagation of the light generated by the light source unit, both the light emission pattern and the first straight pattern being disposed on one of the upper surface and the lower surface of the light guide plate. The first straight pattern has peaks and valleys formed in alternating and repeating manner in a direction substantially perpendicular to a direction of propagation of the light generated by the light source unit. The light emission pattern and the first straight pattern are disposed at a same surface as the light guide plate.

A ratio of surface area of the light emission pattern to surface area of the first straight pattern may increase with increasing distance from the light source unit.

The first straight pattern may comprise a plurality of unit straight patterns, and the unit straight patterns of the first straight pattern may be arranged in a matrix form on one surface of the light guide plate.

Surface areas of the unit straight patterns may decrease with increasing distance from the light source unit.

The light emission pattern may comprise a plurality of unit light emission patterns, and the unit light emission patterns of the light emission pattern may be arranged in a matrix form on one surface of the light guide plate.

The surface of the light emission pattern and the surface of the first straight pattern may form a step.

The light guide plate for a backlight may further include a second straight pattern disposed on an opposite surface of the light guide plate from the surface on which the light emission pattern and the straight pattern are disposed.

The second straight pattern may have peaks and valleys formed in alternating and repeating manner in a direction perpendicular to a direction of propagation of the light generated by the light source unit.

Another exemplary embodiment of the present invention provides a manufacturing method of a light guide plate for a backlight, including: preparing a first substrate having a surface with an uneven profile and a second substrate having a surface with a repeating pattern of protrusions; forming a mold by pressing the first substrate onto a first surface of a photoresist, and pressing the second substrate onto a second surface of the photoresist; positioning a mask on one of the first substrate and the second substrate, and exposing the mold through the mask; forming a film master comprising surfaces with the uneven profile and the repeating pattern of protrusions, by developing the mold; and processing a light guide plate by an imprint method using the film master, so as to imprint the uneven profile and the repeating pattern of protrusions on the light guide plate, the imprinted uneven profile corresponding to a light emission pattern and the imprinted repeating pattern of protrusions corresponding to a straight pattern; wherein the light emission pattern and the straight pattern are disposed at a same surface as the light guide plate.

A ratio of surface area of the light emission pattern to surface area of the straight pattern may increase with increasing distance from the light source unit.

The first straight pattern may comprise a plurality of unit straight patterns, and the unit straight patterns of the first straight pattern may be arranged in a matrix form on one surface of the light guide plate.

Surface areas of the plurality of unit straight patterns may decrease with increasing distance from the light source unit.

The light emission pattern may comprise a plurality of unit light emission patterns, and the unit light emission patterns of the light emission pattern may be arranged in a matrix form on one surface of the light guide plate.

The surface of the light emission pattern and the surface of the first straight pattern may form a step.

The manufacturing method of a light guide plate for a backlight may further include forming a second straight pattern disposed on an opposite surface of the light guide plate from the surface on which the light emission pattern and the first straight pattern are disposed.

The second straight pattern may be formed by a screen printing method using an ink cured or curable by ultraviolet rays.

Yet another exemplary embodiment of the present invention provides a light guide plate for a backlight, including: a light source unit configured to generate light; a light guide plate positioned proximate to the light source unit and including an upper surface and a lower surface; a first straight pattern disposed on the upper surface of the light guide plate and configured to channel the light along a direction substantially parallel to a direction of propagation of the light generated by the light source unit; and a second straight pattern and a light emission pattern disposed on the lower surface of the light guide plate, the light emission pattern configured to diffuse a portion of the light directed toward the image display panel, and the second straight pattern configured to channel the light toward the image display panel. The first straight pattern and the second straight pattern each have peaks and valleys formed in alternating and repeating manner in a direction substantially perpendicular to a direction of propagation of the light generated by the light source unit, and the light emission pattern is disposed between adjacent second straight patterns and has peaks and valleys formed in alternating and repeating manner in a direction substantially parallel to a direction of propagation of the light generated by the light source unit.

Still another exemplary embodiment of the present invention provides a light guide plate for a backlight, including: a light source unit configured to generate light; a light guide plate positioned proximate to the light source unit and including an upper surface and a lower surface; a first straight pattern and a second straight pattern disposed on the upper surface and the lower surface of the light guide plate separately, each of the straight patterns configured to channel the light along a direction substantially parallel to a direction of propagation of the light generated by the light source unit; and a light emission pattern including a plurality of dots disposed on the second straight pattern and configured to diffuse a portion of the light directed toward the image display panel. The first straight pattern and the second straight pattern each have peaks and valleys formed in alternating and repeating manner in a direction substantially perpendicular to a direction of propagation of the light generated by the light source unit. Also, a pitch of the plurality of dots is at least three times a peak pitch of the second straight pattern in a direction substantially perpendicular to a direction of propagation of the light generated by the light source unit.

Still yet another exemplary embodiment of the present invention provides a method of manufacturing a light guide plate for a backlight, including: preparing a light source unit configured to generate light, and a light guide plate positioned proximate to the light source unit and including an upper surface and a lower surface; positioning a mask on the upper surface or the lower surface of the light guide plate; and forming a straight pattern and a light emission pattern at the same time by printing an ink curable by ultraviolet rays using the mask of the light guide plate. The straight pattern has peaks and valleys formed in alternating and repeating manner in a direction substantially perpendicular to a direction of propagation of the light generated by the light source unit.

Also, the light emission pattern is disposed between adjacent straight patterns and has peaks and valleys formed in alternating and repeating manner in a direction substantially parallel to a direction of propagation of the light generated by the light source unit.

According to exemplary embodiments of the present invention, the manufacturing cost can be reduced by simultaneously forming a light emission pattern and a straight pattern on one surface of a light guide plate by using an imprint method. Also, uniformity of light from a planar light source inputted to a liquid crystal panel can be improved by improving the straightness of the light.

DETAILED DESCRIPTION OF THE EMBODIMENTS

Figure 1:
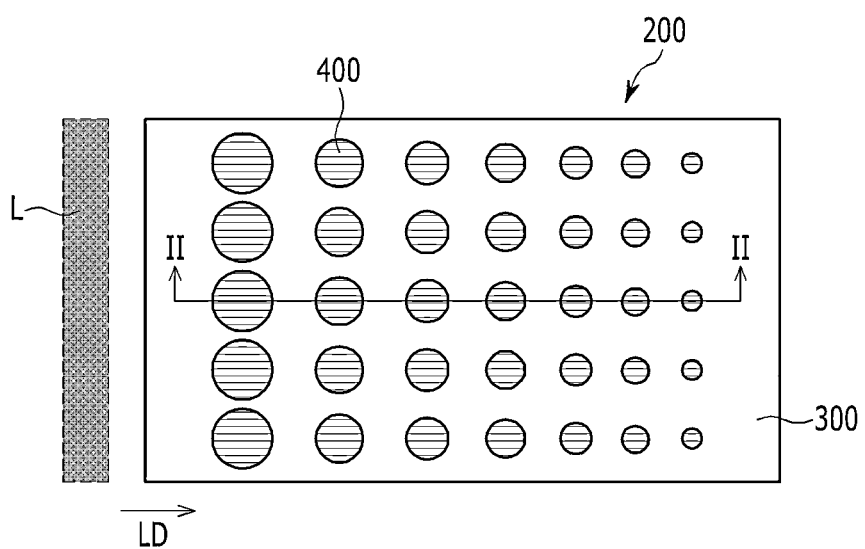
FIG. 1 is a plan view illustrating a light guide plate for a backlight according to an exemplary embodiment of the present invention.

Hereinafter, exemplary embodiments of the present invention will be described in detail with reference to the accompanying drawings. As those skilled in the art would realize, the described embodiments may be modified in various different ways, all without departing from the spirit or scope of the present invention. On the contrary, exemplary embodiments introduced herein are provided to make disclosed contents thorough and complete and sufficient transfer the spirit of the present invention to those skilled in the art.

In the drawings, the thickness of layers, films, panels, regions, etc., are exaggerated for clarity. It will be understood that when a layer is referred to as being "on" another layer or substrate, it can be directly on the other layer or intervening them may also be present. Like reference numerals designate like elements throughout the specification.

Figure 2:
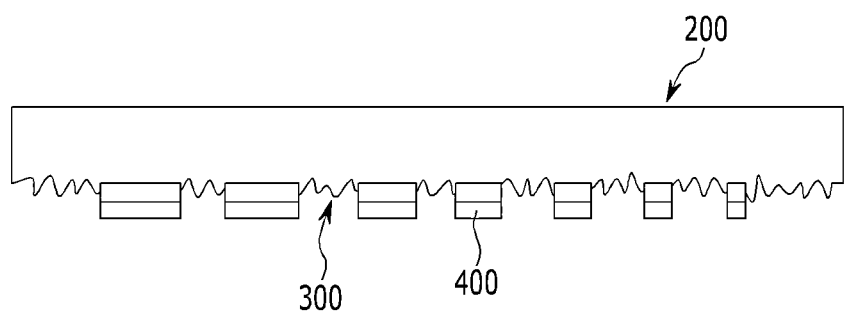
FIGS. 2 and 3 are cross-sectional views taken along a line II-II of FIG. 1.
Figure 3:
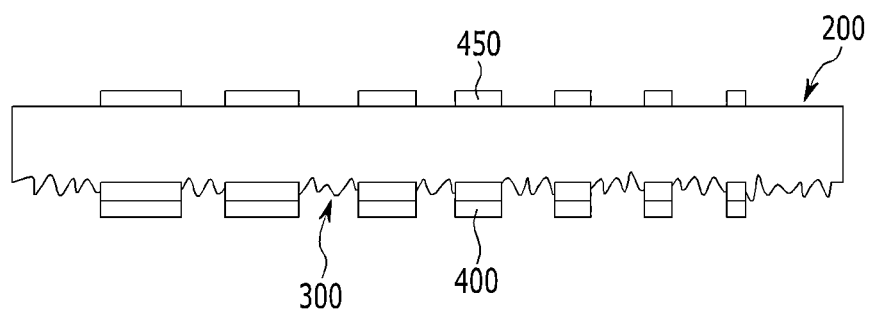
Figure 4:
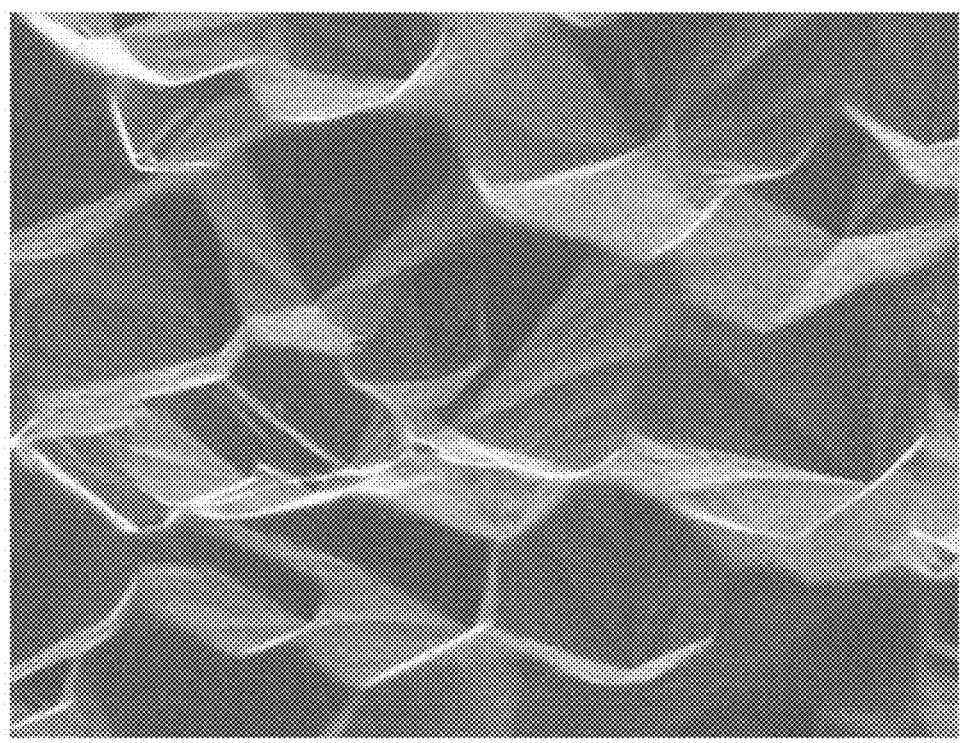
FIG. 4 is a photograph illustrating a light emission pattern formed on one surface of the light guide plate of FIG. 1.
Figure 5:
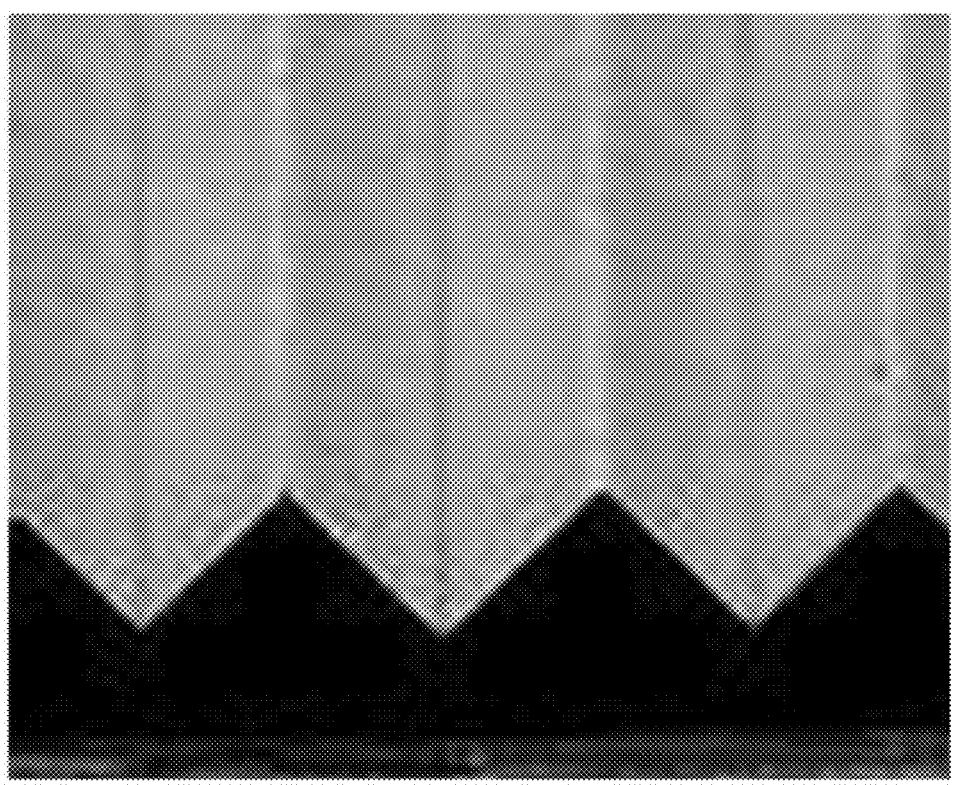
FIG. 5 is a photograph illustrating a straight pattern formed on one surface of the light guide plate of FIG. 1.

FIG. 1 is a plan view illustrating a light guide plate for a backlight according to an exemplary embodiment of the present invention. FIGS. 2 and 3 are cross-sectional views taken along line II-II of FIG. 1. FIG. 4 is a photograph illustrating a light emission pattern formed on one surface of the light guide plate of FIG. 1. FIG. 5 is a photograph illustrating a straight pattern formed on one surface of the light guide plate of FIG. 1.

Referring to FIGS. 1 and 2, a light guide plate for a backlight according to an exemplary embodiment of the present invention includes a light source unit L and a light guide plate 200 adjacent to the light source unit L.

The light source unit L may be a side type backlight or a direct type backlight depending on the layout of the light source. The light source can utilize a fluorescent lamp, an LED element, or the like.

A light emission pattern 300 and a straight pattern 400 are disposed on one surface of the light guide plate 200.

Depending on the relative positions of the light emission pattern 300 and light source unit L, the light emission pattern 300 reflects, diffuses, and/or refracts the light inputted to the light guide plate 200 from the light source unit L, so as to input or direct the light to a liquid crystal panel or other image display panel. Referring to FIG. 4, the light emission pattern 300 has an uneven surface. The light emission pattern 300 is formed on the same surface of the light guide plate 200 as the straight pattern 400, but is not formed on the straight pattern 400. That is, the light emission pattern 300 and the straight pattern 400 are disposed so as not to overlap with each other.

The straight pattern 400 allows light generated from the light source unit L to be channeled, or transmitted more directly to the light guide plate 200, and to uniformly reach far away from the light source unit L. As shown in FIG. 1, the straight pattern 400 can include a plurality of unit straight patterns each having a dot shape and arranged in a matrix form on one surface of the light guide plate 200.

The plurality of unit straight patterns may have a surface upon which peaks and valleys are repetitively formed along a direction which is substantially perpendicular to a leading direction LD of the light generated from the light source unit L. FIG. 5 shows a prism shape as an example of the unit straight pattern shape. However, the unit straight pattern shape is not limited to a prism shape, and may be any shape, such as a semicircular shaped peak.

The surface area of the unit straight patterns decreases with increasing distance from the light source unit L in direction LD. Accordingly, portions of the light guide plate 200 closer to the light source unit L have more surface area devoted to the unit straight patterns and less devoted to the light emission pattern 300, while portions of plate 200 farther from light source unit L have relatively less surface area devoted to the unit straight patterns and more to the light emission pattern 300. In other words, the ratio of surface area of the light emission pattern 300 to surface area of the straight pattern 400 increases with increasing distance from the light source unit L.

As shown in FIG. 2, the light emission pattern 300 and the straight pattern 400 may have step differences in their heights.

As shown in FIG. 3, straight patterns may be additionally disposed on the opposite surface of the light guide plate 200 on which the light emission pattern 300 is located. This additional straight pattern may have a shape in which peaks and valleys are repetitively formed along a direction which is substantially perpendicular to the leading direction LD of the light generated from the light source unit L, like the straight pattern 400 described above. That is, the peaks and valleys repeat in alternating manner, to produce a repeating pattern of peaks followed by valleys. In order to distinguish the straight pattern 400 described above from the added straight pattern, the straight pattern described above is referred to as a first straight pattern 400, and the added straight pattern is termed a second straight pattern 450.

FIGS. 6 to 11 are cross-sectional views illustrating a manufacturing method of a light guide plate for a backlight according to another exemplary embodiment of the present invention.

Figure 6:
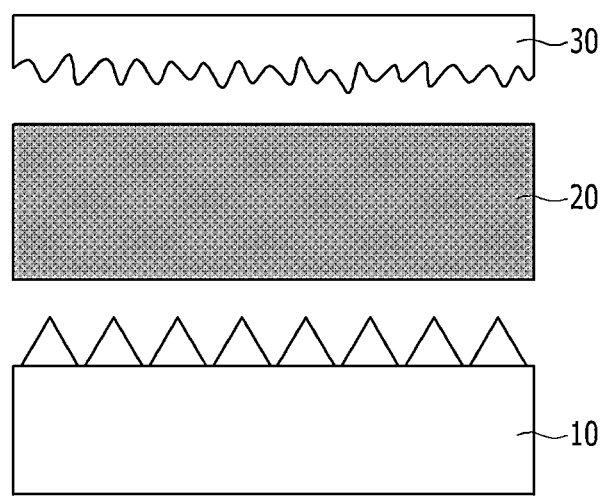
FIGS. 6 to 11 are cross-sectional views illustrating a method of manufacturing a light guide plate for a backlight according to another exemplary embodiment of the present invention.

Referring to FIG. 6, a first substrate 30 formed with uneven patterns (i.e. having a surface with an uneven profile), a second substrate 10 formed with a repeating arrangement of straight patterns such as a prism shape, and a photoresist 20 are prepared.

Figure 7:
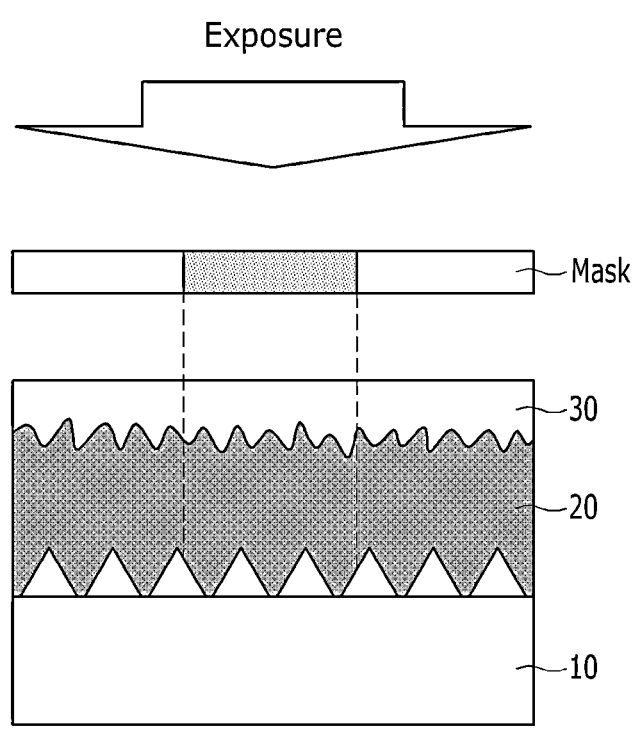

Referring to FIG. 7, the first substrate 30 and the second substrate 10 are pressed onto each surface of the photoresist 20, and then exposed by using a mask.

Figure 8:
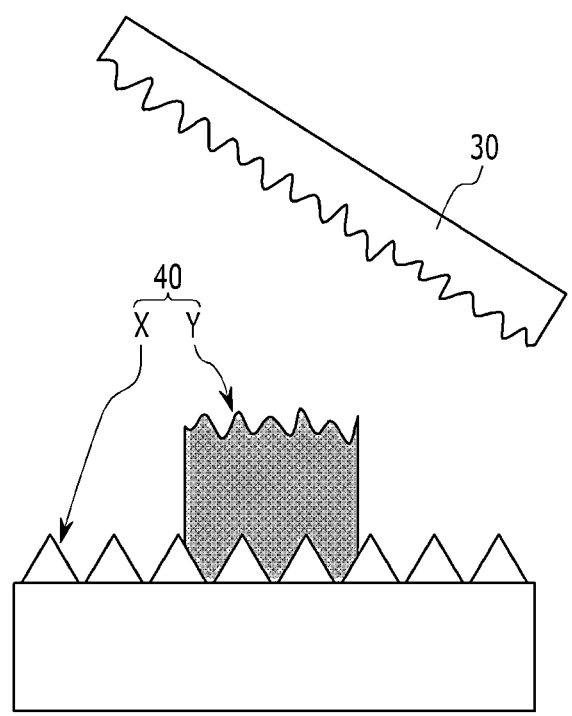

Referring to FIG. 8, a mold configured by the first substrate 30, the second substrate 10, and the photoresist 20 is developed, and then the first substrate 30 is separated to form a film master 40. The film master 40 includes a straight pattern X and a light emission pattern Y both facing the same direction (here, upward).

Figure 9:
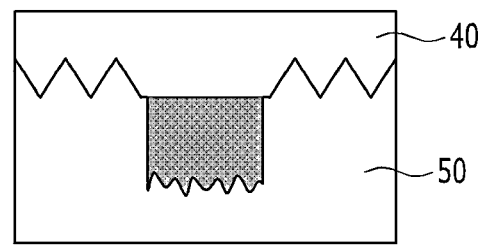

Referring to FIG. 9, a UV resin 50 is coated on the surface of the film master 40.

Figure 10:
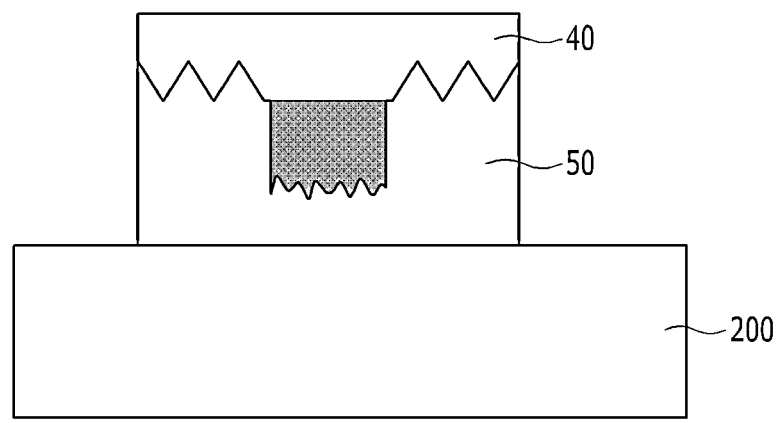

Referring to FIG. 10, the film master 40 coated with the UV resin 50 is attached onto the light guide plate 200, and the UV resin 50 is cured.

Figure 11:
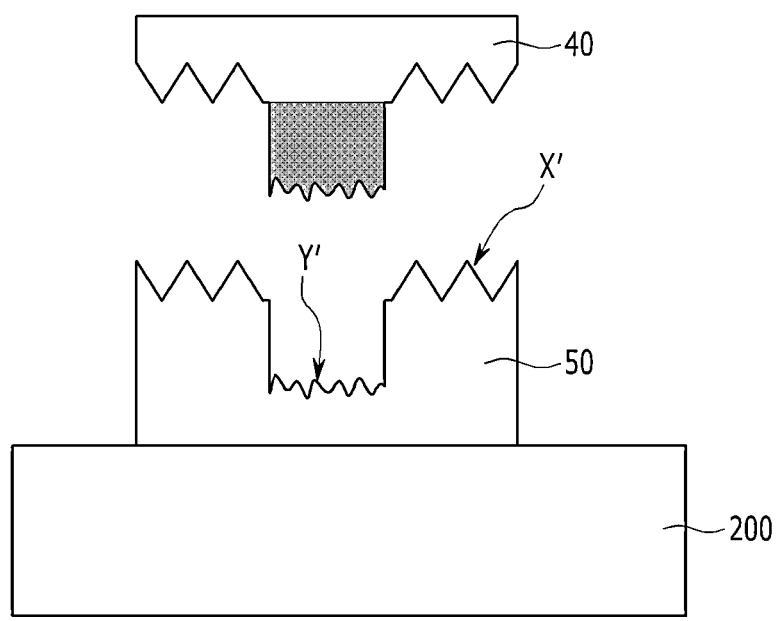

Referring to FIG. 11, the film master 40 is separated from the light guide plate 200 and a straight pattern X' and a light emission pattern Y' are formed on the same surface of the light guide plate 200.

In this exemplary embodiment, the manufacturing cost can be reduced by simultaneously forming the light emission pattern and the straight pattern on the same surface of the light guide plate, via an imprint method.

Figure 12:
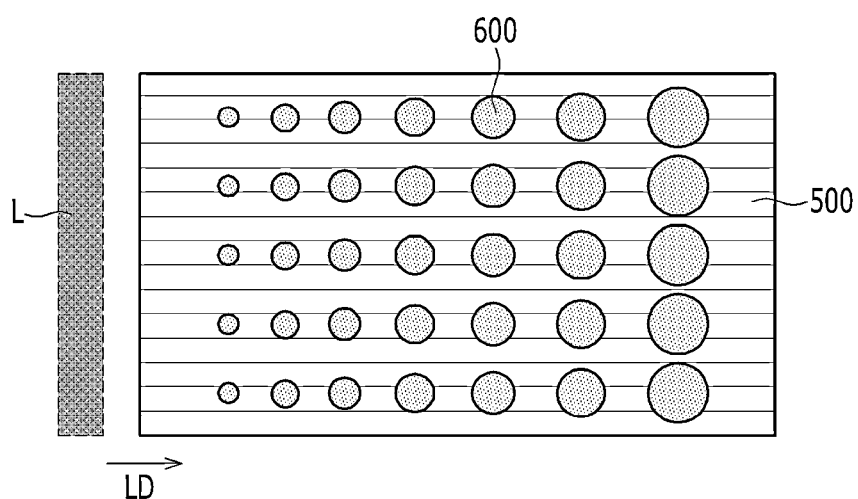
FIG. 12 is a plan view illustrating a light guide plate for a backlight according to yet another exemplary embodiment of the present invention.

FIG. 12 is a plan view illustrating a light guide plate for a backlight according to yet another exemplary embodiment of the present invention.

Referring to FIG. 12, a light guide plate has a shape similar to the exemplary embodiment described with reference to FIGS. 1 and 2. However, unlike the exemplary embodiment of FIG. 1, positions of a light emission pattern and a straight pattern are different from each other.

In the exemplary embodiment, a straight pattern 500 has a shape in which peaks and valleys are repetitively formed along a direction which is substantially perpendicular to a leading direction LD of the light generated from the light source unit L. However, unlike the exemplary embodiment of FIG. 1, a plurality of unit straight patterns are not formed. Instead, a light emission pattern 600 is formed to include a plurality of unit light emission patterns each having a dot shape and which are collectively arranged in a matrix form on one surface of the light guide plate. The size (or surface area) of the unit light emission patterns increases with increasing distance from unit L in the direction LD. Accordingly, the density of the unit light emission patterns increases as the density of light from unit L decreases, compensating for reduction in brightness, such that luminance in a planar light source inputted from the light guide plate to the liquid crystal panel may be more uniform.

The straight pattern 500 may be removed from a region at which the light emission pattern 600 is disposed.

Figure 13:
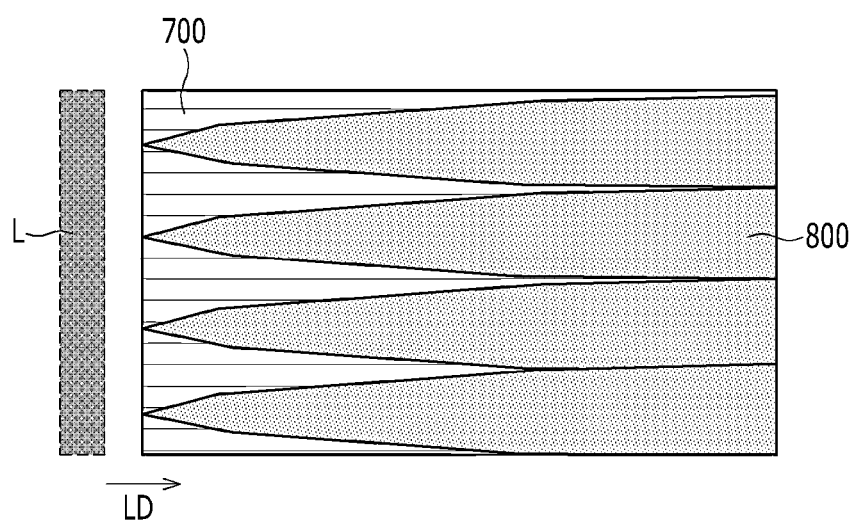
FIG. 13 is a plan view illustrating a light guide plate for a backlight according to still another exemplary embodiment of the present invention.

FIG. 13 is a plan view illustrating a light guide plate for a backlight according to still another exemplary embodiment of the present invention.

In this exemplary embodiment, and similar to the exemplary embodiment of FIG. 12, a straight pattern 700 is formed, but a light emission pattern 800 is elongated in a leading direction LD of the light, rather than being arranged in a matrix configuration. In addition, the unit light emission patterns increases in width with increasing distance from unit L in direction LD.

Figure 14:
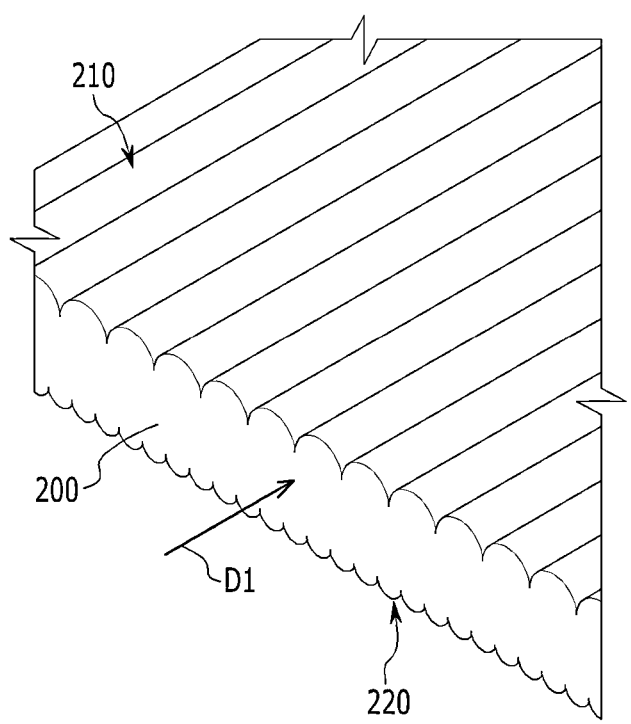
FIG. 14 is a perspective view illustrating a light guide plate for a backlight according to still yet another exemplary embodiment of the present invention.
Figure 15:
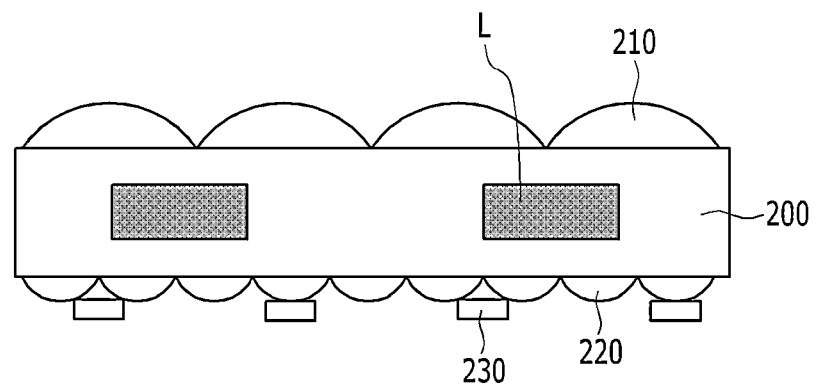
FIGS. 15 and 16 are front views of a light guide plate viewed in the first direction of FIG. 14.
Figure 16:
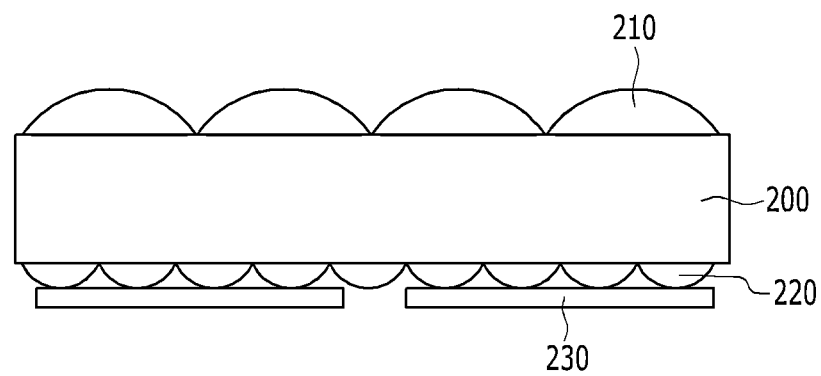

FIG. 14 is a perspective view illustrating a light guide plate for a backlight according to still yet another exemplary embodiment of the present invention. FIGS. 15 and 16 are front views of a light guide plate viewed in a first direction D1. The first direction D1 represents a direction in which light is inputted to a light guide plate 200 from a light source unit L.

Referring to FIGS. 14 to 16, a first straight pattern 210 is disposed on an upper surface of the light guide plate 200 and a second straight pattern 220 is disposed on a lower surface of the light guide plate 200. The first straight pattern 210 and the second straight pattern 220 each have a shape in which peaks and valleys are repetitively formed along a direction perpendicular to the first direction D1. In FIG. 14, peak shapes of the straight patterns 210 and 220 are semicircular in cross section, but are not limited thereto and may be have various other shapes such as a prism shape or the like.

A dot-shaped light emission pattern 230 is disposed on the second straight pattern 220.

In the exemplary embodiment, a peak pitch of the second straight pattern 220 (i.e. the distance between adjacent peaks of the second straight pattern 220) may be a half or less of a peak pitch of the first straight pattern 210 in a direction perpendicular to the first direction D1. A pitch of the dot-shaped light emission pattern 230 (i.e. the distance between centers of adjacent dot-shaped light emission patterns 230) may be at least three times the peak pitch of the second straight pattern 220. If the pitch of the dot-shaped light emission pattern 230 is three times the peak pitch of the second straight pattern 220, as shown in FIG. 15, the dot of the light emission pattern 230 may be formed at the valley of the second straight pattern 220. Accordingly, a physical interference pattern may be generated between the second straight pattern 220 and the dots of the light emission pattern 230. Therefore, in the light guide plate for a backlight according to the exemplary embodiment, the pitch of the dot-shaped light emission pattern 230 is at least three times the peak pitch of the second straight pattern 220, such that the interference pattern can be prevented from being generated.

Figure 17:
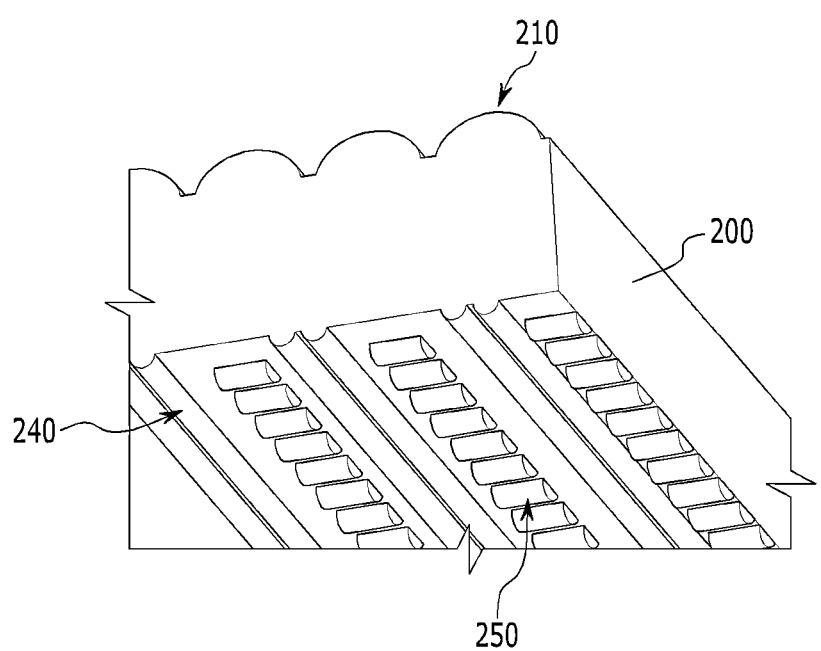
FIG. 17 is a perspective view illustrating a light guide plate for a backlight according to still yet another exemplary embodiment of the present invention.

FIG. 17 is a perspective view illustrating a light guide plate for a backlight according to still yet another exemplary embodiment of the present invention.

Referring to FIG. 17, similar to the exemplary embodiment described in FIG. 14, a first straight pattern 210 is disposed on an upper surface of a light guide plate 200 and a second straight pattern 240 is disposed on a lower surface of the light guide plate 200. The first straight pattern 210 and the second straight pattern 240 each have a shape in which peaks and valleys are repetitively formed along a direction perpendicular to a leading direction of the light generated from the light source unit. In the exemplary embodiment, a light emission pattern 250 is disposed between adjacent second straight patterns 240, and has a shape in which peaks and valleys are repetitively formed along a direction parallel to a leading direction of the light generated from the light source unit.

Figure 18:
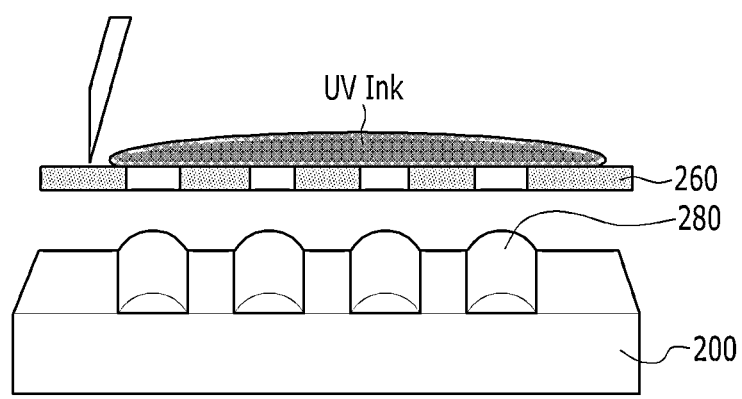
FIG. 18 is a schematic diagram illustrating a method of manufacturing a light guide plate for a backlight according to still yet another exemplary embodiment of the present invention.

FIG. 18 is a schematic diagram illustrating a method of manufacturing a light guide plate for a backlight according to still yet another exemplary embodiment of the present invention.

Referring to FIG. 18, a mask 260 is disposed on one surface of a light guide plate 200, and then a pattern 280 is printed by a screen printing method. In this case, the ink used may be a material curable by ultraviolet rays (UV), and may be a low viscosity ink that forms a lens shape due to surface tension.

Since ultraviolet ray (UV) curable ink is used, a light emission pattern may be formed on the light guide plate without using a separate optical scattering agent. In addition, like the exemplary embodiment of FIG. 16, the second straight pattern 240 and the light emission pattern 250 may be simultaneously formed on one surface of the light guide plate by using this screen printing method.

The straight pattern and the light emission pattern of the exemplary embodiments described above may be formed by using the screen printing method described in FIG. 18.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

200: Light guide plate
230, 300, 600, 800: Light emission pattern
210, 220, 240, 400, 450, 500, 700: Straight pattern

What is claimed is:

1. A light guide plate for a backlight, comprising:
a light source unit configured to generate light;
a light guide plate positioned proximate to the light source unit and including an upper surface and a lower surface; and
a light emission pattern configured to diffuse a portion of the light directed toward an image display panel, and a first straight pattern configured to channel the light along a direction substantially parallel to a direction of propagation of the light generated by the light source unit, both the light emission pattern and the first straight pattern being disposed on one of the upper surface and the lower surface of the light guide plate,
wherein the first straight pattern has peaks and valleys formed in alternating and repeating manner in a direction substantially perpendicular to a direction of propagation of the light generated by the light source unit and
wherein the light emission pattern and the first straight pattern are disposed at a same surface as the light guide plate.

2. The light guide plate for a backlight of claim 1, wherein:
a ratio of surface area of the light emission pattern to surface area of the first straight pattern increases with increasing distance from the light source unit.

3. The light guide plate for a backlight of claim 2, wherein:
the first straight pattern comprises a plurality of unit straight patterns, and the unit straight patterns of the first straight pattern are arranged in a matrix form on one surface of the light guide plate.

4. The light guide plate for a backlight of claim 3, wherein:
surface areas of the unit straight patterns decrease with increasing distance from the light source unit.

5. The light guide plate for a backlight of claim 2, wherein:
the light emission pattern comprises a plurality of unit light emission patterns, and the unit light emission patterns of the light emission pattern are arranged in a matrix form on one surface of the light guide plate.

6. The light guide plate for a backlight of claim 2, wherein:
the surface of the light emission pattern and the surface of the first straight pattern form a step.

7. The light guide plate for a backlight of claim 1, further comprising:

a second straight pattern disposed on an opposite surface of the light guide plate from the surface on which the light emission pattern and the straight pattern are disposed.

8. The light guide plate for a backlight of claim 7, wherein: the second straight pattern has peaks and valleys formed in alternating and repeating manner in a direction perpendicular to the direction of propagation of the light generated by the light source unit.

9. A light guide plate for a backlight, comprising:
a light source unit configured to generate light;
a light guide plate positioned proximate to the light source unit and including an upper surface and a lower surface;
a first straight pattern disposed on the upper surface of the light guide plate, the first straight pattern configured to channel the light along a direction substantially parallel to a direction of propagation of the light generated by the light source unit; and
a second straight pattern and a light emission pattern disposed on the lower surface of the light guide plate, the light emission pattern configured to diffuse a portion of the light directed toward the image display panel, and the second straight pattern configured to channel the light toward the image display panel;
wherein the first straight pattern and the second straight pattern each have peaks and valleys formed in alternating and repeating manner in a direction substantially perpendicular to a direction of propagation of the light generated by the light source unit, and the light emission pattern is disposed between adjacent second straight patterns and has peaks and valleys formed in alternating and repeating manner in a direction substantially parallel to a direction of propagation of the light generated by the light source unit.

10. A light guide plate for a backlight, comprising:
a light source unit configured to generate light;
a light guide plate positioned proximate to the light source unit and including an upper surface and a lower surface;
a first straight pattern and a second straight pattern disposed on the upper surface and the lower surface of the light guide plate, each of the straight patterns configured to channel the light along a direction substantially parallel to a direction of propagation of the light generated by the light source unit; and
a light emission pattern including a plurality of dots disposed on the second straight pattern and configured to diffuse a portion of the light directed toward the image display panel,
wherein the first straight pattern and the second straight pattern each have peaks and valleys formed in alternating and repeating manner in a direction substantially perpendicular to a direction of propagation of the light generated by the light source unit, and
a pitch of the plurality of dots is at least three times a peak pitch of the second straight pattern in a direction substantially perpendicular to a direction of propagation of the light generated by the light source unit.

* * * * *